(12) United States Patent
Murashita (10) Patent No.: US 7,041,974 B2
(45) Date of Patent: May 9, 2006

(54) CONDUCTIVE TRANSPARENT PROBE AND PROBE CONTROL APPARATUS

(75) Inventor: Toru Murashita, Isehara (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 0 days.

(21) Appl. No.: 11/178,293

(22) Filed: Jul. 12, 2005

(65) Prior Publication Data
US 2005/0242282 A1 Nov. 3, 2005

Related U.S. Application Data

(62) Division of application No. 10/228,139, filed on Aug. 27, 2002, now Pat. No. 6,953,930.

(30) Foreign Application Priority Data

Aug. 27, 2001 (JP) .............................. 2001-256206
Nov. 7, 2001 (JP) .............................. 2001-341651

(51) Int. Cl.
*G21K 7/00* (2006.01)

(52) U.S. Cl. ........................ 250/306; 73/105
(58) Field of Classification Search ................ 250/306; 73/105
See application file for complete search history.

(56) References Cited

U.S. PATENT DOCUMENTS

| | | |
|---|---|---|
| 5,559,330 A | 9/1996 | Murashita |
| 5,859,364 A | 1/1999 | Toda et al. |
| 5,994,691 A | 11/1999 | Konada |
| 6,006,594 A | 12/1999 | Karrai et al. |
| 6,094,971 A | 8/2000 | Edwards et al. |
| 6,104,030 A | 8/2000 | Chiba et al. |
| 6,138,503 A | 10/2000 | Ray |
| 6,201,227 B1 | 3/2001 | Tomita |
| 6,257,053 B1 | 7/2001 | Tomita et al. |
| 6,611,178 B1 | 8/2003 | Kawakatsu et al. |
| 6,953,930 B1 * | 10/2005 | Murashita ............... 250/310 |
| 2005/0103994 A1 | 5/2005 | Murashita |

(Continued)

FOREIGN PATENT DOCUMENTS

JP 3121217 12/2000

OTHER PUBLICATIONS

R. Toledo-Crow, et al., Appl. Phys. Lett., vol. 60, No. 24, pp. 2957-2959, "Near-Field Differential Scanning Optical Microscope With Atomic Force Regulation", Jun. 15, 1992.

(Continued)

*Primary Examiner*—Kiet T. Nguyen
(74) *Attorney, Agent, or Firm*—Oblon, Spivak, McClelland, Maier & Neustadt, P.C.

(57) ABSTRACT

A conductive transparent probe used in a probe control apparatus for adjusting a distance between the apex of the probe and a sample by vibrating the probe with a vibrator in a direction perpendicular to the axis of the probe is provided. The conductive transparent probe includes: an optical fiber having a taper part at one end; a conductive transparent film formed on the surface of the taper part; a first metal film formed on the surface of the optical fiber other than the taper part; wherein the conductive transparent film and the first metal film are electrically connected, and length and thickness of the first metal film are determined such that the conductive transparent probe vibrates while contacting with the vibrator.

5 Claims, 6 Drawing Sheets

1 --- PROBE
2 --- CONDUCTIVE TRANSPARENT FILM
3 --- SAMPLE
4 --- GAP
5 --- ELECTRON
6 --- LIGHT
7 --- VIBRATOR
81, 82 --- INSULATOR
9 --- POWER SOURCE FOR VIBRATION
10 --- SENSOR
11 --- SENSING SIGNAL PROCESSING CIRCUIT
12 --- SAMPLE POSITION DRIVING MECHANISM
13 --- CONTROL CIRCUIT FOR THE SAMPLE POSITION DRIVING MECHANISM
14 --- PROBE BIAS POWER SOURCE 14
15 --- CONDUCTIVE HOLDING PLATE
16 --- SUPPORTING STRUCTURE

U.S. PATENT DOCUMENTS

2005/0247875 A1* 11/2005 Murashita .................. 250/306

OTHER PUBLICATIONS

T. Murashita, J. Vac. Sci. Technol. B, vol. 15, No. 1, pp. 32-37, "Novel Conductive Transparent Tip for Low-Temperature Tunneling-Electron Luminescence Mircroscopy Using Tip Collection", Jan./Feb. 1997.

T. Murashita, Oyo Buturi, vol. 70, No. 10, pp. 1191-1195, "Characterization of Semiconductors in Nanometer-Sized Regions by a Probe Collection TL Microscope", Oct. 2001 (Corresponds to Ref. AX).

T. Murashita, JSAP, "Share-Force Mode Atomic Force Microscopy by Using a Conductive Transparent Probe", Sep. 2001 (With English Translation).

* cited by examiner

FIG.1

1 ⋯ PROBE
2 ⋯ CONDUCTIVE TRANSPARENT FILM
3 ⋯ SAMPLE
4 ⋯ GAP
5 ⋯ ELECTRON
6 ⋯ LIGHT
7 ⋯ VIBRATOR
81, 82 ⋯ INSULATOR
9 ⋯ POWER SOURCE FOR VIBRATION
10 ⋯ SENSOR
11 ⋯ SENSING SIGNAL PROCESSING CIRCUIT
12 ⋯ SAMPLE POSITION DRIVING MECHANISM
13 ⋯ CONTROL CIRCUIT FOR THE SAMPLE POSITION DRIVING MECHANISM
14 ⋯ PROBE BIAS POWER SOURCE 14
15 ⋯ CONDUCTIVE HOLDING PLATE
16 ⋯ SUPPORTING STRUCTURE

1 ··· PROBE
2 ··· CONDUCTIVE TRANSPARENT FILM
3 ··· SAMPLE
7 ··· VIBRATOR
9 ··· POWER SOURCE FOR VIBRATION
14 ··· PROBE BIAS POWER SOURCE 14
15 ··· CONDUCTIVE HOLDING PLATE
O ··· CENTER OF AMPLITUDE
A-A' ··· MEASUREMENT TARGET REGION
B-B' ··· AMPLITUDE

FIG.3

21 ··· OPTICAL FIBER
22 ··· CORE
23 ··· CLADDING
24 ··· CONDUCTIVE TRANSPARENT FILM
25 ··· TAPER PART
26 ··· FIRST METAL FILM
28 ··· SENSOR
29 ··· CONDUCTIVE HOLDING PLATE
D ··· DISTANCE BETWEEN THE APEX OF THE CONDUCTIVE TRANSPARENT PROBE AND THE CONDUCTIVE HOLDING PLATE
d ··· DISTANCE BETWEEN THE APEX OF THE CONDUCTIVE TRANSPARENT PROBE AND SENSOR

FIG.4

21 ⋯ OPTICAL FIBER
28 ⋯ SENSOR
29 ⋯ CONDUCTIVE HOLDING PLATE
30 ⋯ VIBRATOR
31 ⋯ SUPPORTING STRUCTURE
32 ⋯ SAMPLE

FIG.5

21 ··· OPTICAL FIBER
22 ··· CORE
23 ··· CLADDING
24 ··· CONDUCTIVE TRANSPARENT FILM
25 ··· TAPER PART
26 ··· FIRST METAL FILM
28 ··· SENSOR
33 ··· SECOND METAL FILM
34 ··· TRANSITIONAL PART FOR CHANGING THICKNESS OF METAL FILM SMOOTHLY

FIG. 6

21 ··· OPTICAL FIBER
22 ··· CORE
23 ··· CLADDING
24 ··· CONDUCTIVE TRANSPARENT FILM
25 ··· TAPER PART
26 ··· FIRST METAL FILM
27 ··· VERY SMALL HOLE
28 ··· SENSOR
29 ··· CONDUCTIVE HOLDING PLATE
35 ··· MATERIAL THROUGH WHICH LIGHT DOES NOT PASS

CONDUCTIVE TRANSPARENT PROBE AND PROBE CONTROL APPARATUS

CROSS-REFERENCE TO RELATED APPLICATIONS

This application is a Divisional Application of U.S. application Ser. No. 10/228,139 filed Aug. 27, 2002, now U.S. Pat. No. 6,953,930, and based upon and claims the benefit of priority to Japanese Patent Application Nos. 2001-256206, filed Aug. 27, 2001; and 2001-341651, filed Nov. 7, 2001, the entire contents each of which are incorporated herein.

BACKGROUND OF THE INVENTION

1. Field of the Invention

The present invention relates to a conductive transparent probe and a probe control apparatus. More particularly, the present invention relates to a conductive transparent probe used in a tunneling luminescence microscope, and a probe control apparatus for controlling a distance between the apex of a probe and a sample, wherein the tunneling luminescence microscope measures optical and electronic characteristics of a very small region of a size of the nanometer order by detecting luminescence caused by applying a probe current into the sample.

2. Description of the Related Art

As devices become small and technologies for utilizing characteristics of individual molecules develop, great demands have arisen for technologies for characteristic evaluation of a very small region of a size of the nanometer order in materials (to be referred to as a nano region hereinafter), and for technologies for optical and electronic characteristic measurement of individual molecules intrinsically having a size of the nanometer order. For realizing such measurement and evaluation, a tunneling luminescence microscope (to be referred to as a TL microscope hereinafter) is provided that enables detection and analysis of luminescence caused by applying a current from an apex of a sharpened probe to a sample. In addition, a probe that is transparent and has conductivity (to be referred to as a conductive transparent probe hereinafter) has been developed, wherein the conductive transparent probe applies a current from its apex into a sample, and at the same time, receives and collects luminescence from the apex, so that luminescence collection yield is improved. The conductive transparent probe is powerfully used for characteristic evaluation of a nano region. As effectiveness of the TL apparatus for characteristic evaluation of a nano region increases, it is demanded by users that the sample to be measured is not only a material having only a conductive region but also a material in which a nonconductive region or a highly resistive region is mixed with the conductive region.

In an apparatus (to be referred to as a probe microscope hereinafter) that measures a sample by bringing a probe extremely close to the surface of the sample, it is very important to properly control a very small distance (to be referred to as a gap hereinafter) between the apex of the probe and the surface of the sample. Therefore, generally, as for the probe microscope (for example, a scanning tunneling microscope (to be referred to as an STM, hereinafter)) that utilizes a tunneling current flowing between the probe and the sample for measurement, a method of detecting the tunneling current flowing between the probe and the sample is used for controlling the gap (this control method is called an STM control method hereinafter). The reason for using this method for realizing precision gap control is that the tunneling current is very sensitive to the gap.

However, the STM control method can be applied only to a sample of which the whole region is electronically conductive, and the STM control method cannot be applied to a sample in which a nonconductive region or a highly resistive region is mixed. Therefore, a TL apparatus that enables gap control without using the tunneling current is desperately desired, such that the TL apparatus can be applied to a sample in which a nonconductive region or a highly resistive region is mixed.

As a gap control method without using the tunneling current, there is a method for utilizing an atomic force such as attractive force and repulsive force between the apex of the probe and the sample. In this method, when the apex of the probe approaches very close to the surface of the sample, atomic force between the apex and the surface is detected, and the gap is adjusted such that the detected value becomes constant.

For feeding back the detected value for performing gap control, there is a method of using an optical lever and a soft probe of a cantilever shape.

In this case, a laser beam is used for detecting a very small displacement of the probe. However, since the laser beam is extremely stronger than a detected signal light used for observing the sample, there is a problem in that the SN ratio decreases when measuring weak luminescence caused by the tunneling current.

It is desirable to use a leaner probe made of an optical fiber in order to suppress optical transmission loss in the probe. However, it is difficult to use such a probe as the soft probe of a cantilever shape that is necessary for realizing an optical lever.

In addition, there is a method called a shear force gap control method. In the method, a linear probe perpendicular to the surface of the sample is vibrated in a direction perpendicular to a center axis of the probe, so that atomic force is detected by measuring amplitude of the probe vibrating at a specific frequency. In this method, when a voltage is applied between the apex of the probe and the sample for causing luminescence, a current flows into a sensor used for detecting the amplitude, so that a detected signal is disturbed and gap control becomes unstable. Therefore, there is a problem in that a voltage cannot be applied between the probe and the sample when the shear force gap control method is used.

SUMMARY OF THE INVENTION

An object of the present invention is to provide a conductive transparent probe that is applicable to the shear force gap control method while the tunneling current can be applied to a very small region without decreasing luminescence collection yield. In addition, another object of the present invention is to provide a probe control apparatus for applying a voltage between the apex of the probe and a sample so as to apply a current from the apex of the probe to cause luminescence from the sample, wherein the probe control apparatus is applicable to a sample in which a nonconductive region or a highly resistive region is mixed with a conductive region, a conductive transparent probe can be used as a probe, and it is not necessary to use a laser beam that decreases the SN ratio when weak luminescence caused by tunneling current is measured.

The above-mentioned object is achieved by a conductive transparent probe used in a probe control apparatus for adjusting a distance between the apex of the conductive transparent probe and a sample by vibrating the conductive transparent probe with a vibrator in a direction perpendicular to the axis of the conductive transparent probe, the conductive transparent probe includes:

an optical fiber having a taper part at one end;

a conductive transparent film formed on the surface of the taper part;

a first metal film formed on the surface of the optical fiber other than the taper part;

wherein the conductive transparent film and the first metal film are electrically connected, and length and thickness of the first metal film are determined such that the conductive transparent probe vibrates while contacting with the vibrator.

According to the above-mentioned conductive transparent probe according to the present invention, shear force gap control can be performed without losing functions of applying a probe current and collecting luminescence, and measurement by using luminescence can be performed stably even for a sample in which a nonconductive region or a highly resistive region is mixed with a conductive region.

The above object is also achieved by a probe control apparatus including:

a probe that is straight and vertical with respect to a surface of a sample;

a vibrator for vibrating the probe in a direction perpendicular to a center axis of the probe;

an amplitude detection part for detecting an amplitude of the probe;

a part for controlling a distance between the apex of the probe and the sample by controlling the amplitude of the probe vibrating at a specific frequency to be a predetermined amplitude;

a voltage applying part for applying a voltage between the apex of the probe and the sample;

wherein the probe has optical transparency and electrical conductivity, and the probe is electrically insulated from the amplitude detection part.

According to the above-mentioned probe control apparatus according to the present invention, gap control between the probe and the sample can be performed stably even for a sample in which a nonconductive region or a highly resistive region is mixed with a conductive region, for which sample it is difficult to perform gap control by using probe current.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

In the following, embodiments of the present invention will be descried with reference to figures.

In the embodiments, a probe control apparatus will be described first, and details of a conductive transparent probe applicable to the probe control apparatus will be described next.

(Probe Control Apparatus)

Figure 1:
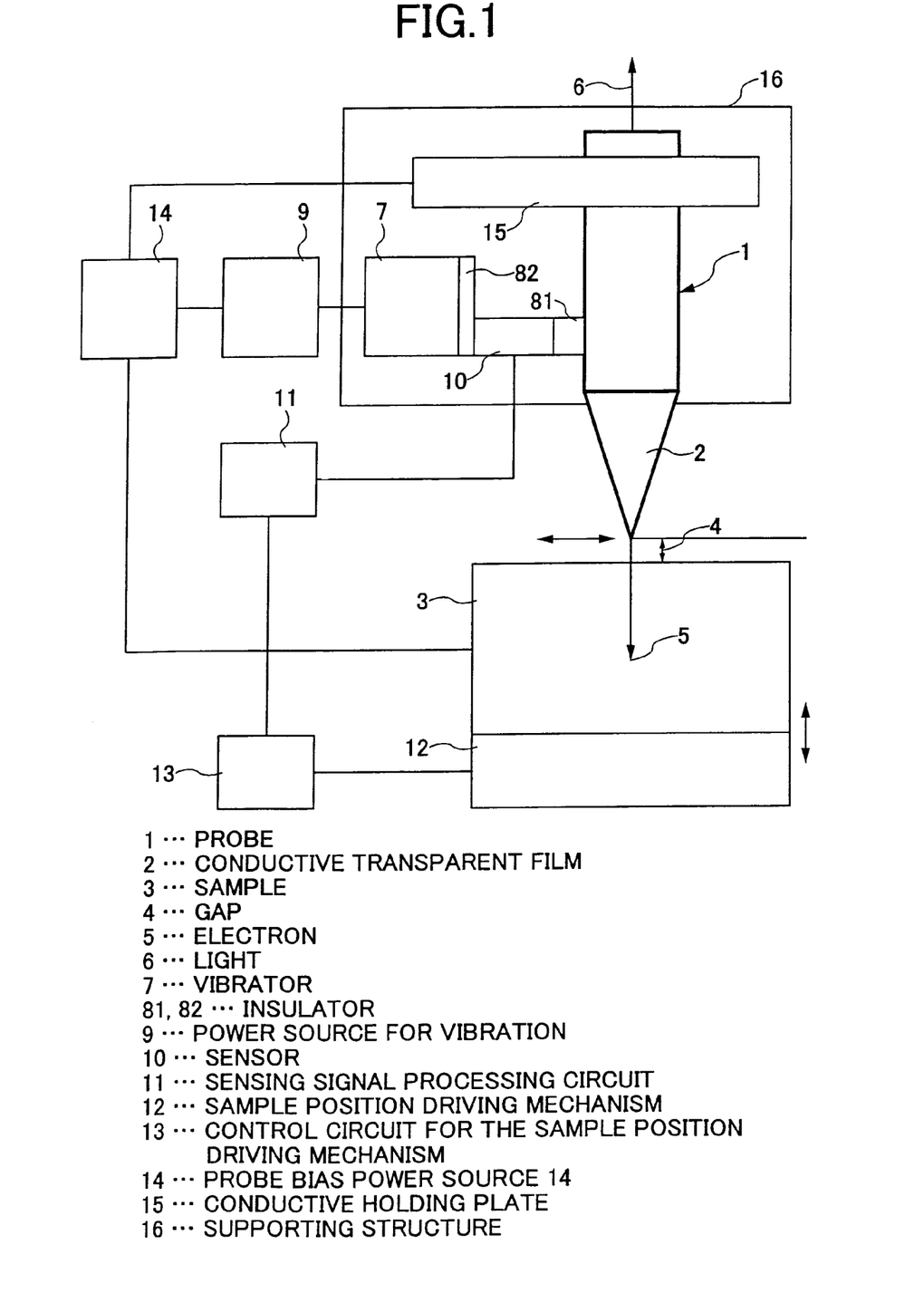
FIG. 1 shows a block diagram of a probe control apparatus of the present invention.

FIG. 1 shows a block diagram of the probe control apparatus of the present invention. As shown in the figure, the probe control apparatus of the present invention includes a probe 1, a vibrator 7, a power source for vibration 9, a sensor 10, a sensing signal processing circuit 11, a sample position driving mechanism 12, a control circuit 13 for the sample position driving mechanism, a probe bias power source 14, a conductive holding plate 15 and a supporting structure 16.

The apex of the linear probe 1 mounted perpendicular to the surface of the sample 3 is tapered to a point. The probe 1 is made of a linear optical fiber having optical transparency. A conductive film is applied on the periphery and the taper part of the optical fiber to provide conductivity, wherein the conductive film applied on the taper part is optically transparent for providing a luminescence collection ability. The probe 1 is held by the conductive holding plate 15 apart from the apex of the probe by 1–2 cm, so that the probe 1 is mounted on the supporting structure 16.

The conductive holding plate 15 is connected to one end of the probe bias power supply 14, and supplies a current from the probe bias power supply 14 to the probe 1. The other end of the probe bias power supply 14 is connected to the sample 3, so that a voltage applying mechanism for applying voltage between the apex of the probe 1 and the sample 3 is formed.

The vibrator 7 for vibrating the probe 1 in a direction perpendicular to the center axis of the probe 1 is provided on the supporting structure 16. The vibrator 7 is connected to the power supply for vibration 9, and pushes a point apart from the apex of the probe 1 by several millimeters via a sensor 10 that is an amplitude detection means, so that the probe 1 is vibrated in the direction parallel to the surface of the sample 3.

The sensor 10 detects the amplitude of vibration of the probe 1, and outputs a voltage value in proportion to a displacement amount (amplitude). The output from the sensor is transmitted to the sample position driving mechanism 12 via the sensing signal processing circuit 11 and the control circuit 13.

The sample position driving mechanism 12 receives an output from the control circuit 13, and moves the sample.

The sensing signal processing circuit 11, the control circuit 13 and the sample position deriving mechanism 12 form a distance control means for controlling a distance (gap 4) between the apex of the probe 1 and the sample 3.

An insulator 81 electrically insulates the probe 1 from the sensor 10, and an insulator 82 electrically insulates the sensor 10 from the vibrator 7.

An operation of the probe control apparatus of the present invention is as follows.

The probe 1 is placed on the sensor 10, and is vibrated by the sensor 10 in the direction perpendicular to the center axis of the probe 1 at a resonance frequency. The sensor 10 outputs a voltage corresponding to vibration of the probe 1. At frequencies near the resonance frequency, if the frequency changes slightly, the amplitude of the probe 1 changes greatly. Thus, the amplitude of the probe 1 is monitored with the vibrator 10 for sensing at a frequency slightly apart from the resonance frequency. In this status, the apex of the probe 1 approaches the surface of the sample 3 (the operation for the probe 1 approaching the sample 3 is referred to as "approach").

Even after starting the approach, while the gap 4 is so large that atomic force between the probe 1 and the sample 3 can be neglected, the probe 1 continues to vibrate at a constant frequency and a constant amplitude. Therefore, the amplitude of voltage output from the sensor 10 is constant, since the voltage change corresponds the vibration.

Next, when the probe 1 further approaches the surface of the sample 3 so closely that atomic force becomes large, the atomic force acts as a resistance (a shear force) to the vibration of the probe 1, and the frequency changes. Therefore, the amplitude monitored by the sensor 10 changes. When the amplitude of the probe 1 changes, output voltage data of the sensor 10 also change. When the amplitude of the output voltage becomes a predetermined value, approach of the probe is stopped. After that, the gap 4 between the probe 1 and the surface of the sample is adjusted by performing feedback control such that the amplitude of the probe 1 is constant.

If a current flows to the sensor 10 from the probe 1 when applying a voltage between the apex of the probe 1 and the sample 3, the detected signal output from the sensor 10 is disturbed and gap control becomes unstable. For preventing this signal disturbance, the insulator 81 is inserted between the probe 1 and the sensor 10, so that they are electrically insulated.

The atomic force occurs irrespective of whether the sample 3 is conductive or nonconductive. Therefore, gap control between the probe 1 and the surface of the sample 3 can be performed even when the sample 3 includes both a conductive region and a nonconductive region or a highly resistive region. For example, when the probe 1 is placed above the nonconductive region of the sample 3, the gap 4 between the probe 1 and the surface of the sample 3 is controlled properly by using atomic force although the probe current does not flow. When the probe 1 is placed above the conductive region of the sample 3, gap control is performed by using the atomic force, and, in addition, tunneling current and luminescence caused by the current can be detected since the probe current can be applied.

That is, tunneling current and luminescence caused by the tunneling current can be measured even for a sample in which a nonconductive region or a highly resistive region is mixed with a conductive region, for which sample it is difficult to control the gap 4 by using the tunneling current. In addition, since detection of the gap 4 is performed by the sensor 10 so that a laser beam is not used, the SN ratio of the detected signal light is not lowered when measuring weak luminescence caused by the tunneling current. Therefore, measurement with a high SN ratio can be achieved.

In addition, since it is not necessary to use a soft probe of a cantilever shape, a probe made of a linear optical fiber applicable to forming a conductive transparent probe can be used.

Further, since the insulator 81 is inserted between the probe 1 and the sensor 10 so as to electrically insulate the sensor 10 from the probe 1, current does not flow to the sensor 10 from the probe 1 even when a voltage is applied between the probe 1 and the sample 3. Thus, the detected signal is not disturbed, so that gap control is performed stably.

Figure 2A:
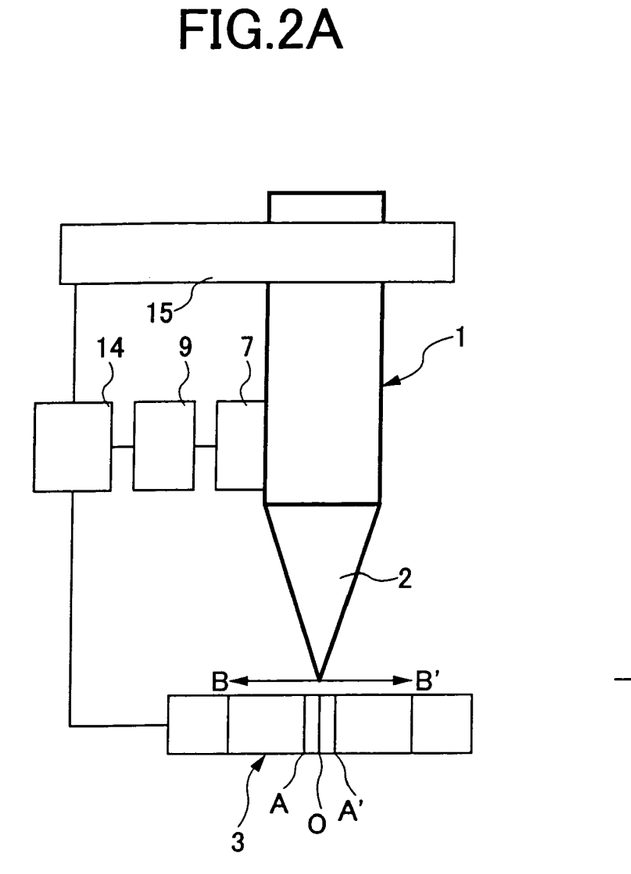
FIG. 2A shows a relative position of the apex of a probe 1 and a sample 3 of FIG. 1.
Figure 2B:
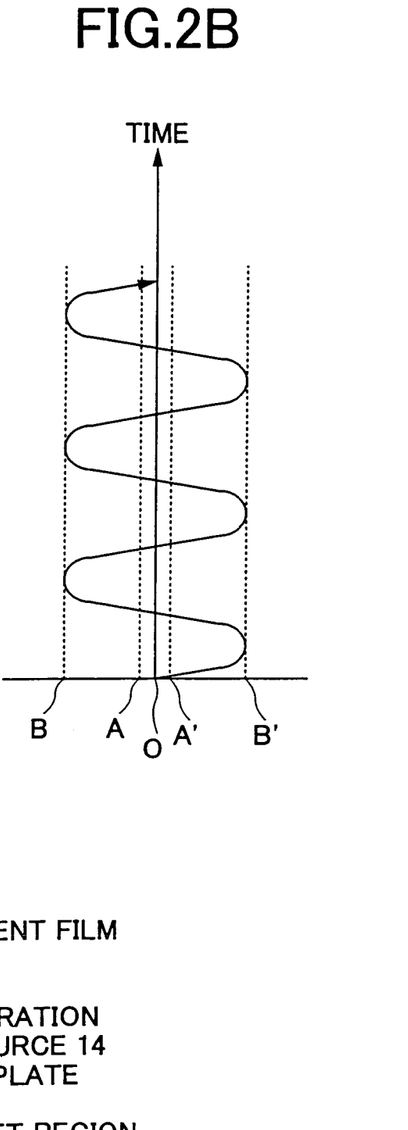
FIG. 2B shows a status in which the apex of the probe 1 moves sinusoidally with respect to the time axis.

FIGS. 2A and 2B show a relationship between an amplitude B–B' of vibration of the apex of the probe 1 in the horizontal direction and a measurement target region A–A' of the sample 3. FIG. 2A shows a relative position of the apex of the probe 1 and the sample 3. FIG. 2B shows a status in which the apex of the probe 1 moves sinusoidally with respect to the time axis.

In the probe control apparatus of the present invention, since the gap 4 is controlled by using the atomic force between the probe 1 and the sample 3, it is necessary that the shear force caused by the atomic force acts on the probe 1 sufficiently. Therefore, it is difficult to lessen the horizontal amplitude B–B' of the apex of the probe 1 to a value less than several tens of nanometers. Therefore, spatial resolution in measurement is limited by the amplitude B–B'.

In this embodiment, to avoid such limitation, the current applied to the sample 3 from the probe 1 is applied like a pulse in synchronization with the phase of vibration of the apex of the probe 1. The timing for applying current can be synchronized with any phase. For example, in this embodiment, a pulse voltage is applied from the probe bias power source 14 while the apex of the probe 1 is located in the measurement target region A–A' which is near the center O of the amplitude. Accordingly, even when the amplitude B–B' of the apex of the probe 1 in the horizontal direction necessary for controlling the gap 4 is large, the spatial resolution of measurement by tunneling current and luminescence of the tunneling current can be intensified according to smallness of the measurement target region A–A'.

As mentioned above, according to the probe control apparatus of the present invention, the probe control apparatus is applicable to a sample in which a nonconductive region or a highly resistive region is mixed with a conductive region, and a conductive transparent probe can be used without using a laser beam, which lowers the SN ratio when measuring weak luminescence caused by tunneling current. In addition, a voltage can be applied between the apex of the probe and the sample for applying a current from the apex of the probe to the sample to cause luminescence.

Since the voltage applying mechanism applies a pulse voltage between the apex of the probe and the sample in synchronization with vibration of the probe, spatial resonance for measurement by using tunneling current and luminescence of the tunneling current can be intensified even if the amplitude of the apex of the probe in the horizontal direction necessary for controlling the gap is large.

(Conductive Transparent Probe)

Next, a conductive transparent probe applicable for use in the above-mentioned probe control apparatus will be described.

In order to perform gap control stably by the shear force gap control by using the above-mentioned probe control apparatus, it is necessary for the probe to have a smooth frequency-to-amplitude characteristic (represented by a curve indicating a relationship between frequency and amplitude) with few parasitic vibrations. For realizing this characteristic, it is necessary that the probe and the vibrator be integrated while vibrating, so that the probe vibrates by following faithfully the vibration of the vibrator. In order that the probe and the vibrator vibrate together, it is necessary that the probe has a moderate rigidity for keeping moderate contacting pressure between the probe and the vibrator, and that the probe has a moderate elasticity to vibrate stably. If the probe is so soft that contacting pressure between the probe and the vibrator is small, the probe vibrated by the vibrator jumps (amplitude of the probe exceeds that of the vibrator) from the vibrator, so that the probe does not vibrate together with the vibrator and does not follow faithfully the vibration of the vibrator, and parasitic vibration occurs. Thus, movement of the probe becomes unstable. If the probe is so rigid that the contact pressure is too large, the probe may be broken, or the probe cannot be vibrated at the desired amplitude, so that proper movement cannot be obtained.

However, a conventional probe used for STM is short, and a thick metal plating is applied on the surface of the probe for preventing mechanical vibration that may cause noise. Thus, rigidity of the probe is large, so that rigidity and elasticity are not proper for realizing shear force gap control. Therefore, the probe cannot be used for shear force gap control. Therefore, a conductive transparent probe is used as follows in the present invention.

Figure 3:
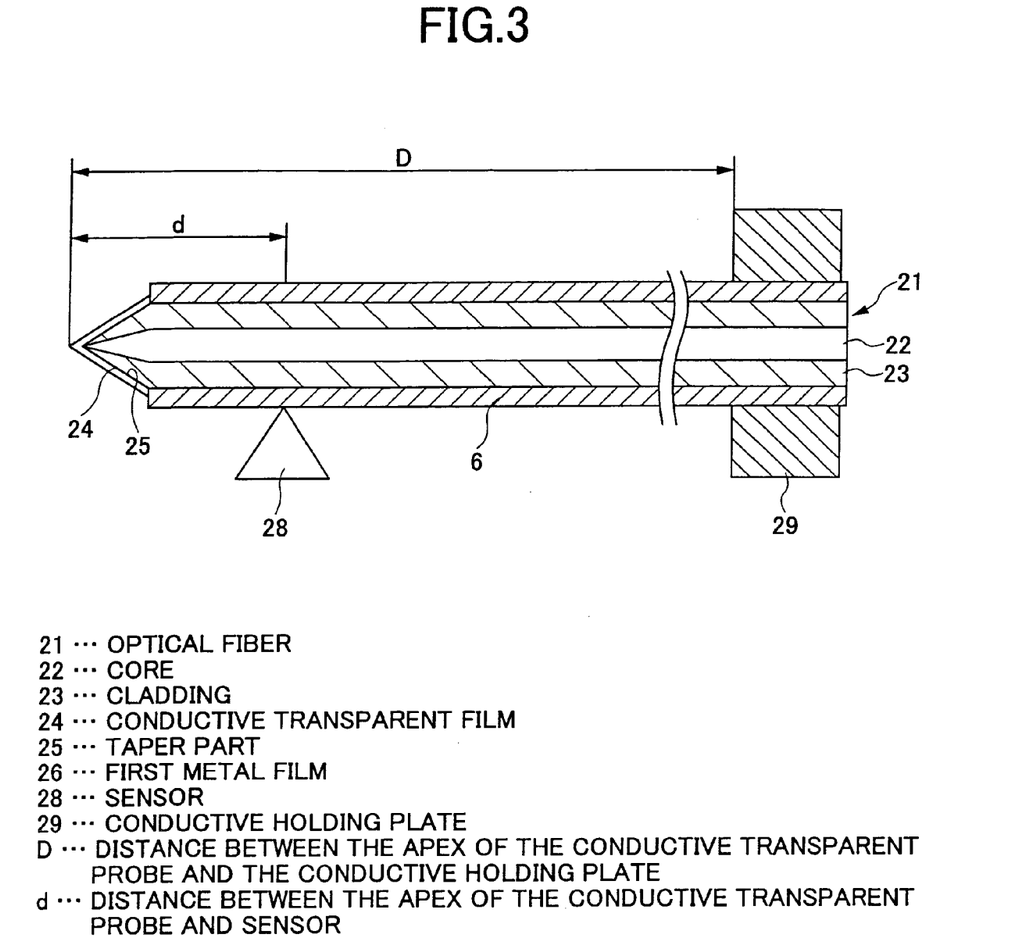
FIG. 3 shows a horizontal section of the first embodiment of a conductive transparent probe of the present invention.

FIG. 3 shows a horizontal section of the first embodiment of the conductive transparent probe of the present invention.

The conductive transparent probe is made of an optical fiber 21 including a core 22 and a cladding 23. A taper part 25 is provided in the optical fiber 21, wherein the taper part 25 ranges within several hundred micrometers from one end opposed to a sample 32 in the optical fiber 21, and the apex of the taper part 25 is sharpened to a size of the nanometer order. To provide conductivity and a luminescence collection function to the taper part 25 of the nonconductive optical fiber 21, a conductive transparent film 24 having conductivity and transparency is applied on the surface of the taper part 25. In addition, in order to provide conductivity to the optical fiber 21, a first metal film 26 having conductivity is applied on the outer surface of the optical fiber 21. The conductive transparent film 24 and the first metal film 26 are connected electrically.

Tunneling current is applied from the apex of the conductive transparent probe to the sample 32, and luminescence caused by the tunneling current is collected from the apex of the same conductive transparent probe.

Figure 4:
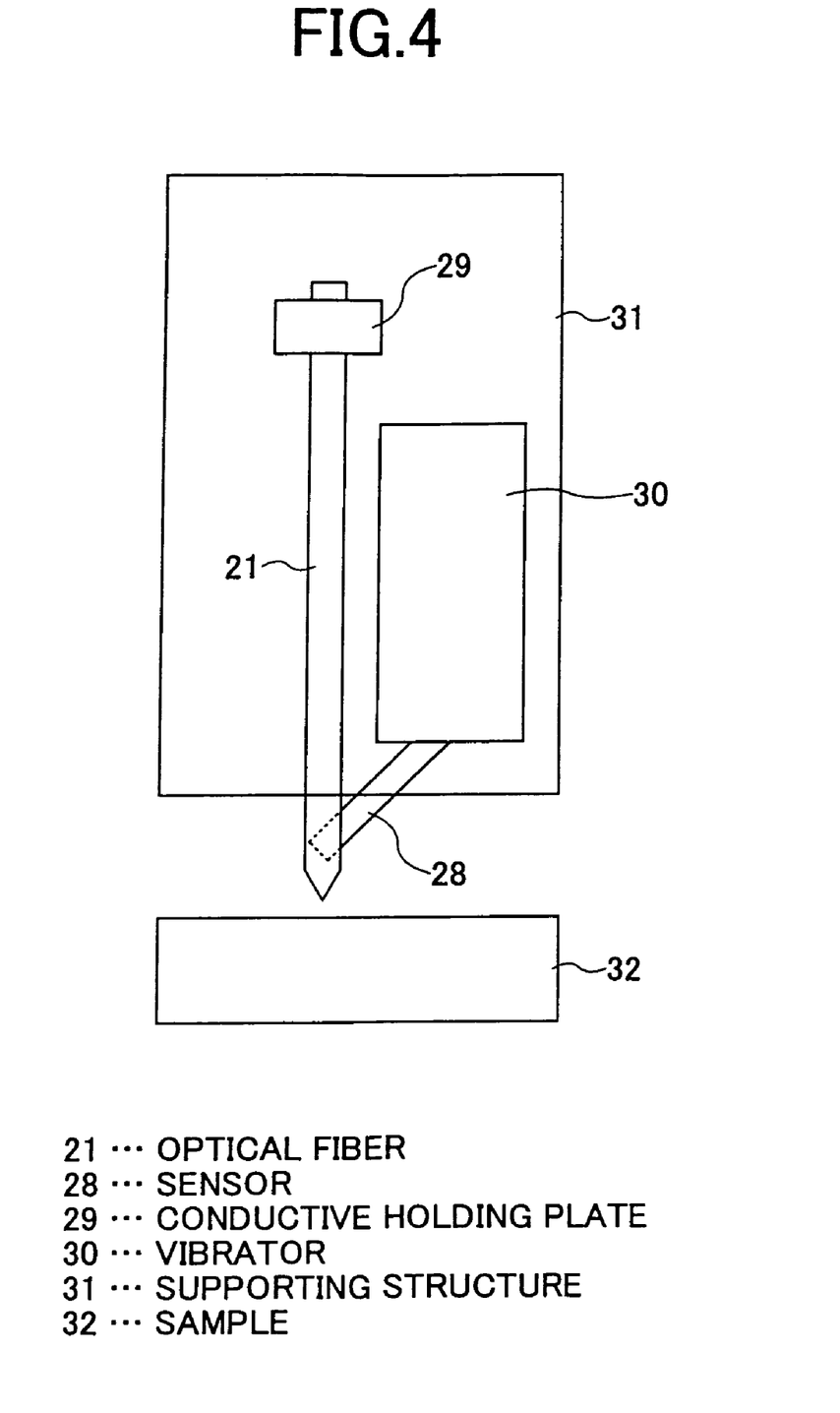
FIG. 4 shows a basic structure of a shear force gap control system in which the conductive transparent probe of the present invention is implemented.

A part ranging from a point apart from the one end by a distance D to the other end of the optical fiber 21 is held by a conductive holding plate 29 formed by a metal plate, for example, so that the conductive transparent probe is mounted on the supporting structure 31 (refer to FIG. 4). The conductive holding plate 29 is connected to a bias power source (not shown in the figure). Since the holding plate 29 contacts the first metal film 26 of the conductive transparent probe electrically, it has a function to provide a current to the conductive transparent probe.

The current from the bias power source is supplied to the apex of the conductive transparent probe via the first metal film 26 on the surface of the optical fiber 21 and the conductive transparent film 24 on the taper part 25.

The conductive transparent probe is vibrated in a direction perpendicular to the axis of the optical fiber 21 by using a sensor 28 that pushes a point (vibration point) apart from the one end (apex) by a distance d (d<D, about several millimeters). The sensor 28 is attached to a vibrator 30 (FIG. 4), and has a function to transmit vibration of the vibrator 30 to the conductive transparent probe and a function to detect vibration and amplitude of the conductive transparent probe. The sensor 28 is electrically insulated from the conductive transparent probe.

When the vibrator 30 operates, the conductive transparent probe vibrates at a frequency and an amplitude corresponding to those of a cantilever of a length D. In order to transmit vibration of the vibrator 30 to the apex of the conductive transparent probe faithfully, it is desirable to shorten the distance d. In addition, in order for the conductive transparent probe to vibrate easily, it is desirable to set the vibration point apart from the part where the conductive transparent probe is held, and to make the distance D as large as possible. According to an experiment, stable operation was obtained and the probe was easy to handle when the distance D was no less than 5 mm and the distance d was about 2–3 mm, wherein the distance D is almost the same as the length of the first metal film 26 from a part adjacent to the taper part 25 to the other end.

Next, operation of a shear force gap control system in which the conductive transparent probe of the present invention is implemented will be described.

FIG. 4 shows a basic structure of the shear force gap control system in which the conductive transparent probe of the present invention is implemented. Although the shear force gap control system is similar to the probe control apparatus described by using FIG. 1, the structure is simplified in the following embodiments since the conductive transparent probe is mainly described.

As shown in the figure, a part of the other end side of the conductive transparent probe is held by the conductive holding plate 29. At this time, the conductive transparent probe is placed on the back side of the sensor 28. Next, the conductive transparent probe is bent a little, and the conductive transparent probe is put on the sensor 28 such that a point a distance d apart from the apex of the conductive transparent probe is placed on the front of the sensor 28. By elastic force caused by the bending, the conductive transparent probe and the sensor 28 contact each other with moderate contacting pressure.

Next, the conductive transparent probe is vibrated in a direction perpendicular to the axis of the optical fiber 21 (that is, parallel to the surface of the sample) at a specific frequency. The vibrated conductive transparent probe vibrates as a cantilever having a fixed end that is the part attached to the conductive holding plate 29. The sensor 28 outputs a voltage corresponding to the amplitude of vibration of the conductive transparent probe.

While the conductive transparent probe is vibrated at a frequency slightly different from an Eigen frequency, when the frequency is changed slightly, the amplitude of the conductive transparent probe changes greatly. Thus, the conductive transparent probe is vibrated at a frequency slightly different from the Eigen frequency, and the amplitude is monitored by the sensor 28.

When atomic force between the conductive transparent probe and the sample 32 becomes large as the conductive transparent probe approaches the sample 32, the atomic force acts on the conductive transparent probe as a shear force in a direction perpendicular to the axis of the optical fiber 21. The shear force acts as a resistance force against vibration of the conductive transparent probe vibrating as a cantilever. Thus, the frequency of the conductive transparent probe changes slightly so that the amplitude of the conductive transparent probe at a monitored frequency is changed. This change of the amplitude is detected as a change of output voltage of the sensor 28. When the amplitude of the output voltage becomes a predetermined value, that is, when the shear force becomes a predetermined value, the approach of the conductive transparent probe to the sample 32 is stopped. After that, the gap between the conductive transparent probe and the sample 32 is controlled such that the amplitude of the conductive transparent probe at the monitored frequency is constant (that is, such that shear force is constant) while performing measurement. Accordingly, stable operation of an AFM (Atomic Force Microscope) can be obtained, wherein the AFM is a microscope performing the gap control by using atomic force (Yang et al. "Near-field differential scanning optical microscope with atomic force regulation", Appl. Phys. Lett., 60(24), Jun. 15, 1992, for example, can be referred to for more information on conventional AFM).

Since the shear force gap control is stably performed irrespective of conductivity of the sample 32, it becomes possible to realize a TL apparatus using the conductive transparent probe, that is applicable to a sample in which a nonconductive region or a highly resistive region is mixed with a conductive region.

For satisfying a contacting condition between the conductive transparent probe and the sensor 28 necessary for conducting stable shear force gap control, thickness and length of the first metal film 26 applied on the outer surface of the optical fiber 21 are adjusted, so that flexural rigidity of the conductive transparent probe is adjusted. As a material of the first metal film 26, nickel, stainless steel and the like can be used, for example. However, any other material can be used as long as adhesive force between the material and the surface of the optical fiber 21 is strong and conductivity is high.

If the distance D from the end of the conductive transparent probe to the conductive holding plate 29 is equal to or less than several millimeters, the flexural rigidity of the optical fiber 21 becomes large. Therefore, there occurs a case in which the sensor 28 slides on the surface of the conductive transparent probe, so that vibrations of the vibrator 30 do not transfers to the optical fiber 21 faithfully.

When the thickness of the first metal film 26 of the outer surface of the optical fiber 21 is smaller than about 0.2 µm, the optical fiber 21 is easily broken by a slight shear force. In addition, if first metal film 26 is thin, electrical resistance from the holding plate 29 to the apex of the optical fiber 21 becomes large, so that it becomes difficult to supply a current to the apex of the optical fiber 21. Therefore, a conductive transparent probe having a thin first metal film 26 is not practical.

On the other hand, if the thickness of the first metal film 26 is greater than 10 µm, rigidity of the conductive transparent probe becomes large, so that a large force is necessary for bending the conductive transparent probe. When bending the conductive transparent probe forcibly, plastic deformation occurs so that the shape does not return to its original shape. Therefore, the conductive transparent probe having a thick first metal film 26 is not applicable to the shear force gap control.

According to an experiment, when thickness of the first metal film 26 was 0.2–10 µm, the conductive transparent probe 21 had elasticity proper for shear force gap control, and good electrical conductivity, so that the conductive transparent probe had good characteristics for shear force gap control.

As mentioned above, when the length of the first metal film 26 from the part adjacent to the taper part 25 to the other end is equal to or greater than 5 mm, and thickness of the first metal film 26 is 0.2–10 µm, contacting pressure between the conductive transparent probe and the sensor 28 becomes a proper value, so that the conductive transparent probe vibrated by the sensor 28 does not jump from the sensor 28. The conductive transparent probe integrates with the sensor 28, and follows vibration of the sensor 28 faithfully. The movement of the conductive transparent probe does not become unstable due to parasitic vibration and the like. The conductive transparent probe is not too stiff and contact pressure is not too large. In addition, the conductive transparent probe does not break, and is oscillated at the desired amplitude. Thus, the conductive transparent probe operates properly.

Stress concentrates on a boundary part between a part performing bending vibration as a cantilever and a part held by the conductive holding plate 29. Thus, the boundary part is easily broken. In addition, the optical fiber 21 may be distorted by pressure applied to the conductive transparent probe from the holding plate 29 for fixing the conductive transparent probe, so that there is a case that optical characteristics of the conductive transparent probe degrade.

Figure 5:
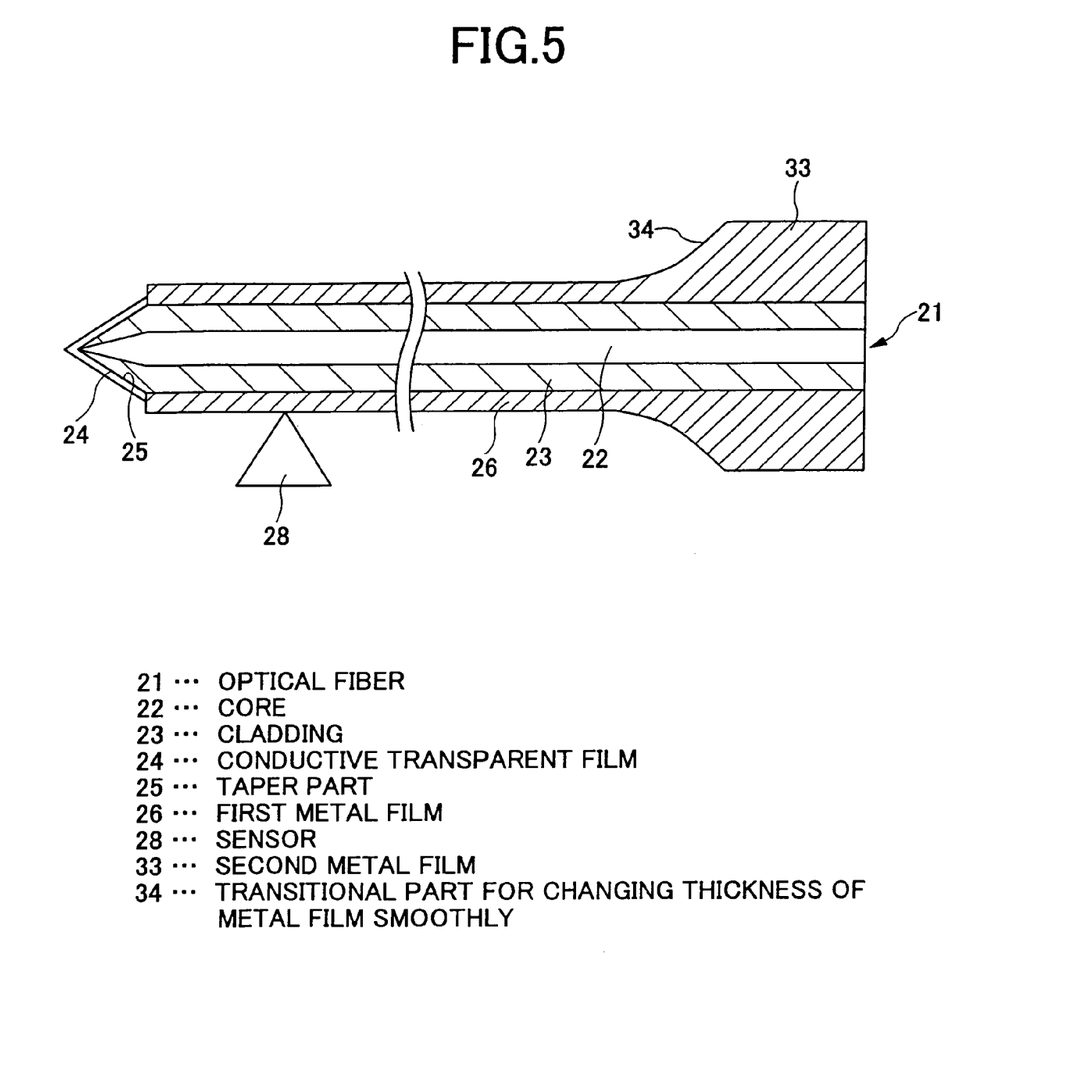
FIG. 5 shows a horizontal section of the second embodiment of a conductive transparent probe of the present invention.

In a second embodiment of the present invention shown in FIG. 5, a second metal film 33 is formed on the side of the other end of the conductive transparent probe, such that the optical fiber 21 is not distorted by a pressure applied to the optical fiber 21 from the holding plate 29, wherein the thickness of the second metal film 33 is larger than that of the first metal film 26. As a result of an experiment, it was found that the thickness of the second metal film 33 needed to be no less than 10 µm, and preferably no less than 50 µm. In this embodiment, if the thickness of metal film between the first metal film 26 and the second metal film 33 changes discontinuously, there is a possibility that the conductive transparent probe will be broken since stress concentrates on the part where the thickness changes discontinuously. Therefore, a transitional part 34 where thickness of metal film changes smoothly is provided between the first metal film 26 and the second metal film 33. By adopting such a structure, the conductive transparent probe can be mounted firmly with reliability by the holding plate 29 without degrading optical characteristics of the conductive transparent probe. In addition, a conductive transparent probe that is hard to break by stress concentration can be realized.

Figure 6:
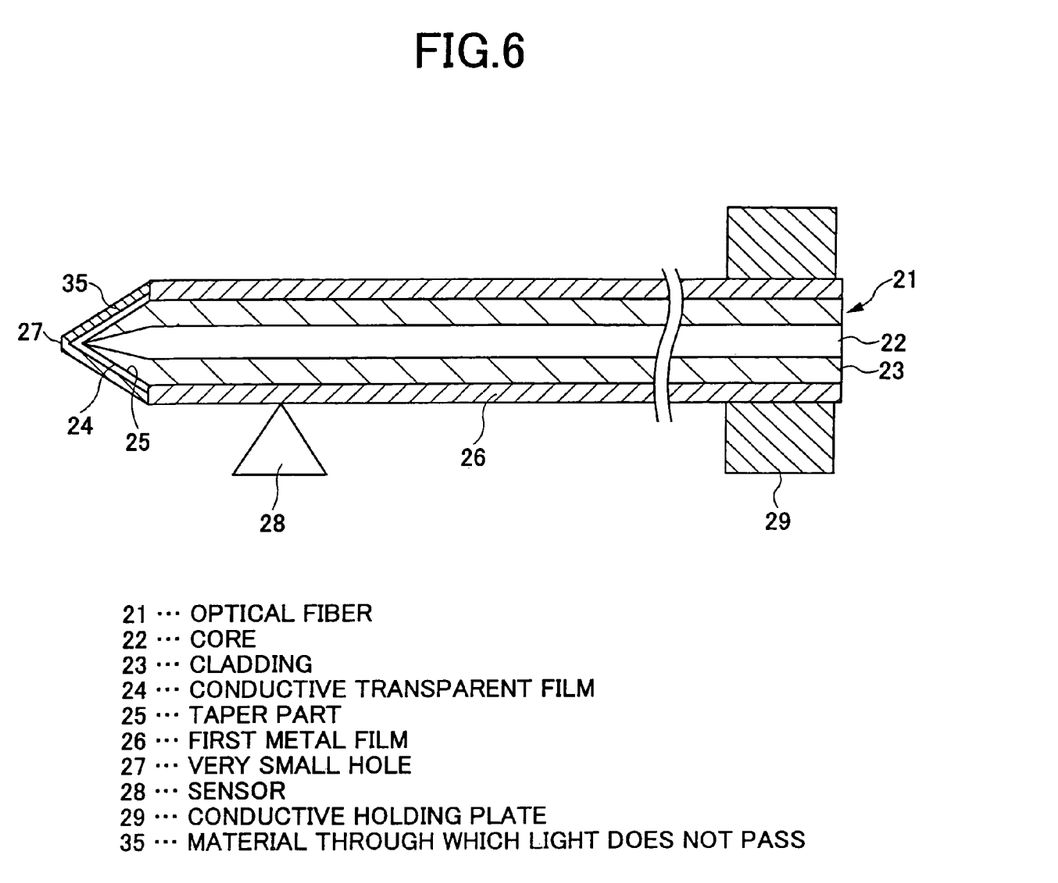
FIG. 6 shows a horizontal section of the third embodiment of a conductive transparent probe of the present invention.

FIG. 6 is a section view of the third embodiment of the conductive transparent probe of the present invention. As shown in the figure, in this embodiment, the taper part 25 provided in one end part of the conductive transparent probe is covered with a material 35 through which light cannot pass, and a very small hole is provided at the apex of the taper part 25 opposed to the sample 32. By adopting such a structure, it becomes possible to selectively collect only near optical fields in the tunneling current luminescence.

In the above-mentioned configuration of the probe control apparatus for controlling the gap by using shear force, vibration of the vibrator is applied to the conductive transparent probe via the sensor contacting the conductive transparent probe, and the sensor detects changes, due to atomic force, of amplitude of the conductive transparent probe. However, the configuration is not limited to this example. There is following another configuration of the gap control apparatus for using shear force. That is, instead of fixing the conductive transparent probe to the holding plate 29, the conductive transparent probe can be fixed directly to the vibrator, and a laser beam is directed to the conductive transparent probe from the side direction of the conductive transparent probe, and, change of amplitude of the conductive transparent probe is detected by measuring the laser beam modulated by vibration of the conductive transparent probe. The conductive transparent probe can be applied to an apparatus for performing shear force gap control by such method using a laser beam.

As mentioned above, according to the conductive transparent probe, length and thickness of the first metal film from a part adjacent to the taper part to the other end are set to values such that the conductive transparent probe vibrates while integrating with the vibrator. Therefore, it becomes possible to realize a conductive transparent probe applicable to shear force gap control while tunneling current can be applied and luminescence collection yield is not degraded. Thus, the present invention produces the effect of enabling stable TL measurement for a sample in which a nonconductive region or a highly resistive region is mixed with a conductive region.

Especially, a conductive transparent probe having bending rigidity applicable to shear force gap control can be realized by setting the length of the first metal film to be no less than 5 mm, and setting the thickness of the first metal film to be 0.2–10 μm.

In addition, in the conductive transparent probe of the present invention, a second metal film is formed on an outer surface of the other end side, wherein thickness of the second metal film is no less than 10 μm, and the first metal film and the second metal film are connected by using a transitional part whose thickness changes continuously. Therefore, the conductive transparent probe can be held firmly with high reliability without degrading optical characteristics, and the conductive transparent probe is not broken even when bending stress concentrates on a part.

Further, in the conductive transparent probe, the taper part is covered by a material through which light cannot pass, and a very small hole is provided on the apex of the taper part covered by the material, wherein the diameter of the hole is smaller than a wavelength of a transmission light. Accordingly, only near optical fields can be collected.

The present invention is not limited to the specifically disclosed embodiments, and variations and modifications may be made without departing from the scope of the invention.

What is claimed is:

1. A probe control apparatus, comprising:
   a probe including,
   an optical fiber having a tapered end forming an apex,
   an electronically conductive transparent film formed on a surface of the tapered end, and
   a first metal film formed on a first surface of said optical fiber other than the surface of the tapered end and electrically connected to said electrically conductive transparent film;
   a vibrating unit configured to vibrate said probe in a vibrating motion perpendicular to a median axis of said probe;
   an amplitude detection unit configured to detect an amplitude of said probe;
   a distance controlling unit configured to control a distance between said probe and a sample;
   a voltage applying unit configured to apply a voltage between said probe and the sample; and
   an insulating unit configured to electrically insulate said amplitude detection unit from said probe,
   wherein said probe control apparatus controls a distance between an apex of said probe and the sample via a shear force gap control method.

2. The probe control apparatus as claimed in claim 1, said voltage applying unit comprising:
   a pulse voltage applying unit configured to apply a pulse voltage between said probe and the sample in synchronization with a phase of the vibrating motion of said probe.

3. The probe control apparatus as claimed in claim 1, wherein the length of said first metal film is no less than 5 mm and the thickness of said first metal film is from 0.2 μm to 10 μm.

4. The probe control apparatus as claimed in claim 1, wherein the probe further includes:
   a second metal film formed on a second surface of said optical fiber other than the surface of the tapered end, said second metal film being no less than 10 μm thick; and
   a transitional metal film formed on a third surface of said optical fiber other than the surface of the tapered end and connecting said first metal film with said second metal film, said transitional metal film having a thickness that continuously increases along a direction from said first metal film to said second metal film.

5. The probe control apparatus as claimed in claim 1, wherein the probe further includes:
   a material configured to prevent transmission of light from said electrically conductive transparent film to portions of the tapered end other than the apex.

* * * * *